US 9,224,386 B1

(12) United States Patent
Weber

(10) Patent No.: US 9,224,386 B1
(45) Date of Patent: Dec. 29, 2015

(54) DISCRIMINATIVE LANGUAGE MODEL TRAINING USING A CONFUSION MATRIX

(75) Inventor: Frederick V. Weber, New York, NY (US)

(73) Assignee: Amazon Technologies, Inc., Seattle, WA (US)

(*) Notice: Subject to any disclaimer, the term of this patent is extended or adjusted under 35 U.S.C. 154(b) by 396 days.

(21) Appl. No.: 13/531,376

(22) Filed: Jun. 22, 2012

(51) Int. Cl.
*G10L 15/06* (2013.01)
*G10L 15/08* (2006.01)
*G10L 15/14* (2006.01)

(52) U.S. Cl.
CPC ............... *G10L 15/06* (2013.01); *G10L 15/08* (2013.01)

(58) Field of Classification Search
CPC ....... G10L 15/06; G10L 15/063; G10L 15/08; G10L 15/083; G10L 15/10; G10L 15/18; G10L 15/183; G10L 15/187; G10L 15/14
USPC ......... 704/236, 238, 240, 242, 252, 254, 255, 704/244
See application file for complete search history.

(56) References Cited

U.S. PATENT DOCUMENTS

| | | | | |
|---|---|---|---|---|
| 5,675,706 | A * | 10/1997 | Lee et al. | 704/256 |
| 6,324,510 | B1 * | 11/2001 | Waibel et al. | 704/256.7 |
| 6,789,231 | B1 * | 9/2004 | Reynar et al. | 704/9 |
| 7,406,416 | B2 | 7/2008 | Chelba et al. | |
| 7,774,197 | B1 | 8/2010 | Bulyko | |
| 8,260,614 | B1 * | 9/2012 | Zhao et al. | 704/243 |
| 8,301,436 | B2 | 10/2012 | Wang | |
| 8,311,825 | B2 | 11/2012 | Chen | |
| 8,589,163 | B2 * | 11/2013 | Ljolje et al. | 704/255 |
| 2004/0193408 | A1 * | 9/2004 | Hunt | 704/209 |
| 2005/0216265 | A1 | 9/2005 | Chelba et al. | |
| 2005/0228670 | A1 * | 10/2005 | Mahajan et al. | 704/256 |
| 2007/0038450 | A1 * | 2/2007 | Josifovski | 704/255 |
| 2007/0078653 | A1 | 4/2007 | Olsen | |
| 2007/0271241 | A1 * | 11/2007 | Morris et al. | 707/3 |
| 2008/0281593 | A1 * | 11/2008 | Deligne et al. | 704/243 |
| 2009/0076817 | A1 * | 3/2009 | Jeon et al. | 704/240 |
| 2009/0099841 | A1 | 4/2009 | Chen | |
| 2009/0112596 | A1 | 4/2009 | Syrdal et al. | |
| 2010/0211390 | A1 * | 8/2010 | Hillebrecht et al. | 704/240 |
| 2013/0191126 | A1 * | 7/2013 | Thambiratnam et al. | 704/245 |

OTHER PUBLICATIONS

Kurata et al. Acoustically Discriminative Language Model Training with Pseudo-Hypothesis, SciVerse ScienceDirect, Speech Communication, 2011, pp. 219-228.

(Continued)

*Primary Examiner* — Martin Lerner
(74) *Attorney, Agent, or Firm* — Knobbe, Martens, Olson & Bear, LLP

(57) ABSTRACT

Features are disclosed for discriminative training of speech recognition language models. A confusion matrix can be generated from acoustic model training data for use in discriminative training. The confusion matrix can include probabilities for the substitution, insertion, and/or deletion of some or all subword units of a language. Probabilities can be calculated based on the presence or absence of subword units in a processed acoustic model training data audio recording when compared to a correct transcription of the recording. The probabilities can be used to generate erroneous transcriptions in language model training corpora, and the language model can be trained to distinguish the erroneous transcriptions from the correct transcriptions.

31 Claims, 9 Drawing Sheets

(56) References Cited

OTHER PUBLICATIONS

Printz, et al. Theory and Practice of Acoustic Confusability, Computer Speech and Language, Academic Press, 2001, 34 pages.
Kurata, et al. Acoustically Discriminative Training for Language Models, IBM Research, Tokyo Research Laboratory, IBM Japan, Ltd., ICASSP, 2009, pp. 4717-4720.
Stolcke, Andreas, Entropy-based Pruning of Backoff Language Models, Speech Technology and Research Laboratory, SRI International, 1998, 5 pages.
Sagae, K., et al. "Hallucinated N-Best Lists for Discriminative Language Modeling", ICASSP 2012, 4 pages.
Hall, "Best-first World-lattice Parsing: Techniques for integrated syntactic language modeling", May 2005, Brown University, dissertation for the degree of Doctor of Philosophy, pp. 1-104.
Stolcke, "Entropy-based Pruning of Backoff Language Models", Jun. 2000, SRI International.
Chen et al., "An Empirical Study of Smoothing Techniques for Language Modeling", Jun. 1996, Annual Meeting of the ACL.

* cited by examiner

DISCRIMINATIVE LANGUAGE MODEL TRAINING USING A CONFUSION MATRIX

BACKGROUND

Modern speech recognition systems typically include an acoustic model and a language model. The acoustic model is used to generate hypotheses regarding which subword units, e.g. phonemes, correspond to an utterance based on the acoustic features of the utterance. The language model is used to determine which of the hypotheses generated using the acoustic model is the most likely transcription of the utterance based on lexical features of the language in which the utterance is spoken. The acoustic model and language model are typically configured using training data, including transcriptions known to be correct. Discriminatively training the acoustic and language models configures the models so that known correct results are more easily distinguished from results known to be incorrect.

BRIEF DESCRIPTION OF THE DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Introduction

Generally described, the present disclosure relates to speech recognition language model training. Specifically, aspects of the present disclosure relate to generating a confusion matrix from acoustic model training data. Confusion matrices may include probabilities that each subword unit of a language may be confused with other units of the language. Subword units may correspond to the sounds of a language and a spoken word may comprise one or more subword units in sequence. The subword units may be in any form known to one of skill in the art. For example, subword units may be phonemes, triphones, diphones, syllables, or parts of syllables, or whole-word models. Confusion matrices may also include probabilities that each subword unit may be incorrectly inserted into or deleted from a recognized hypothesis when compared to a known correct transcription. A confusion matrix can be used to generate errors from known transcriptions. Discriminative training of a language model involves modifying the language model so that it can more clearly discriminate between the known correct transcription and the errors generated using a confusion matrix. The language model may then be utilized to transcribe utterances without an associated correct transcription, and users of the speech recognition system may then have a higher degree of confidence that the proposed transcription is correct.

Further aspects of the present disclosure relate to the use of top-N lists, lattices, or a combination thereof for generating the probabilities. A speech recording may be processed by a speech recognizer to generate one or more recognition hypotheses, and each hypothesis may be associated with a probability that it corresponds to the words spoken in the speech recording. Because a speech recognizer may make errors in recognizing words, having more than one hypothesis may provide information about other possible correct words. The recognition hypotheses may be stored in various data structures, such as a top-N list or lattice. Each entry of a top-N list may be a list of recognition hypotheses and the list may be ordered such that the most probable hypothesis is at the top of the list.

Figure 4A:
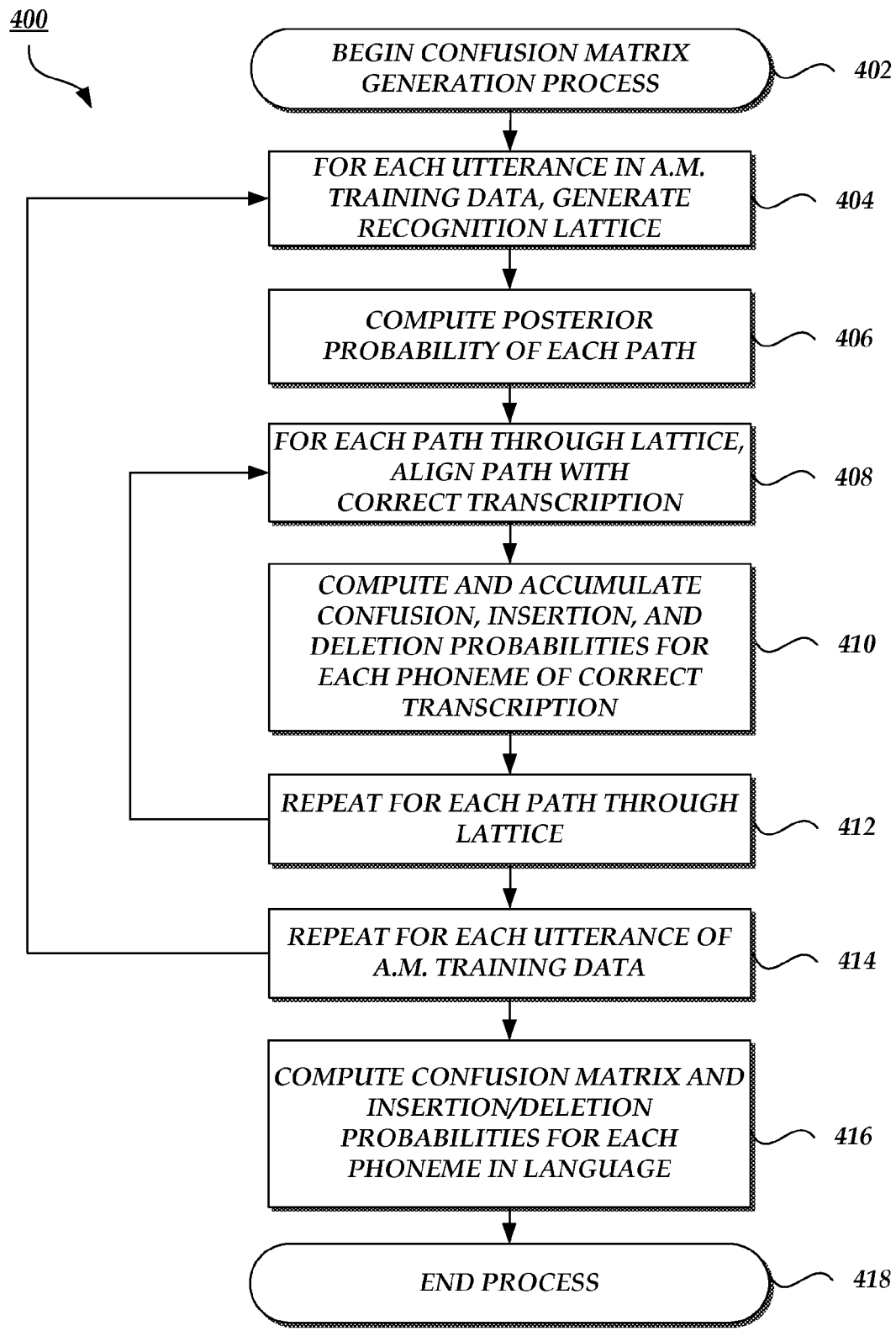
FIG. 4A is a flow diagram of an illustrative process for generating a confusion matrix incorporating substitution, deletion and insertion errors.
Figure 4B:
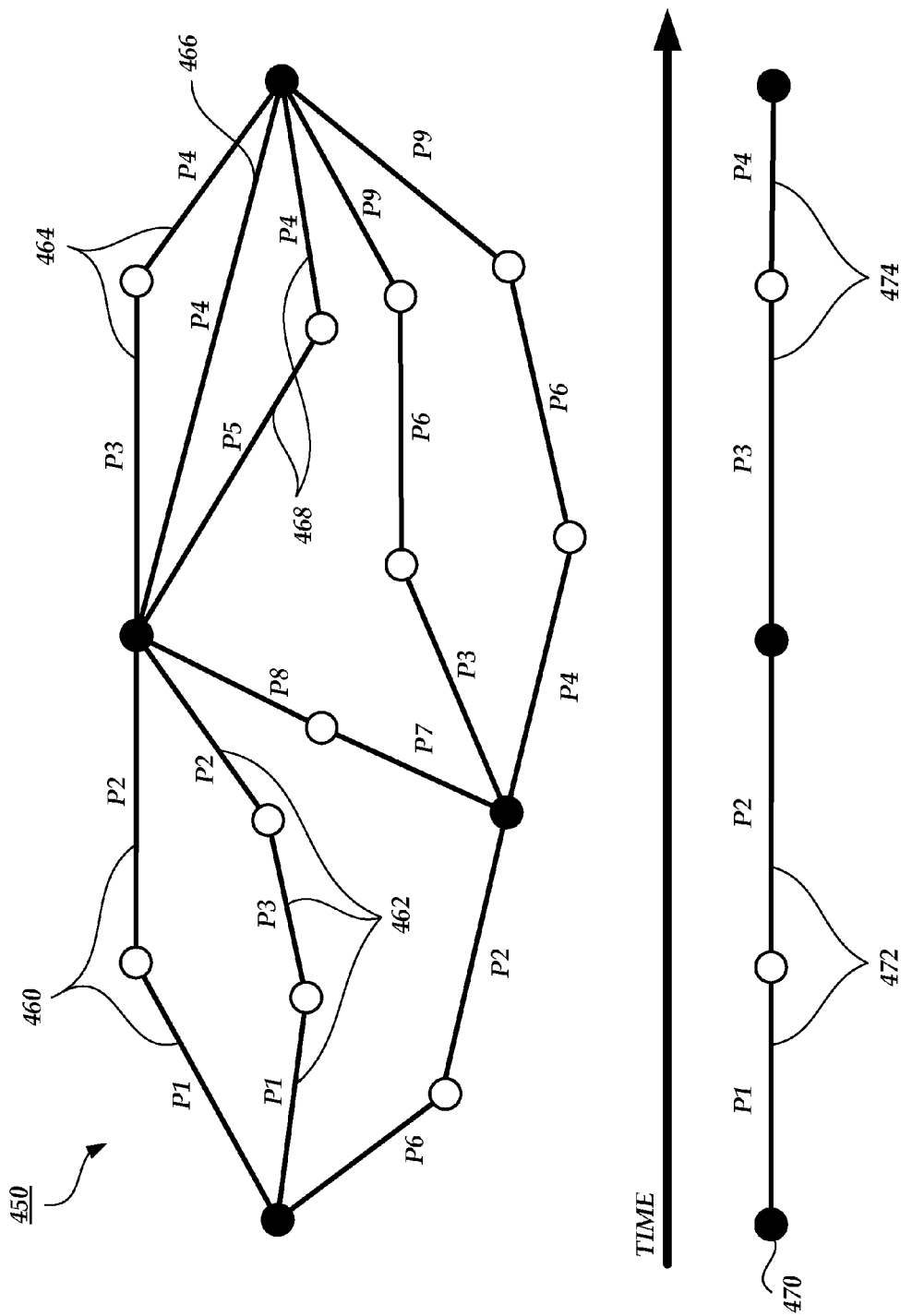
FIG. 4B is a lattice diagram of an illustrative lattice used by the process of FIG. 4A.

A lattice may store the recognition hypothesis in a more compact data structure, and an example of a lattice is shown in FIG. 4B. A lattice may be a directed acyclic graph where the segments (or arcs) are associated with recognized words (or subword units) in the hypotheses and the words are joined at nodes. Each segment may be associated with a probability that the word associated with the segment is a correct word. Each path through the lattice may correspond to a recognition hypothesis. The lattice may be a more compact representation since common words in the recognition hypotheses may be represented by a single segment. For example, if all of the recognition hypotheses started with the word "the," then the lattice could begin with a single segment for the word "the" and then segments for subsequent words in the hypotheses would follow the initial segment.

The recognition hypotheses (whether stored in a top-N list or a lattice) may be aligned with a correct transcription of the recording, for example by using a Levenshtein distance. The Levenshtein distance aligns correct words (or subword units) in a hypothesis with correct words (or subword units) of the transcription and determines the number of errors in a recognition hypothesis where an error can be one of three types: an insertion error, a deletion error, or a substitution error. The Levenshtein distance may be implemented using dynamic programming.

When a recognition hypothesis contains a word that is not present in the transcript and the surrounding words in the hypothesis are correct, then the extra word is an insertion error. For example, if the transcript is "the sky is blue" and the hypothesis is "the sky is be blue," then the word "be" in the hypothesis is an insertion error.

When a recognition hypothesis is missing a word that is present in the transcript and the words surrounding the missing word are correct, then the missing word is a deletion error. For example, if the transcript is "the sky is blue" and the hypothesis is "the sky blue," then the absence of "is" in the hypothesis is a deletion error.

When a recognition hypothesis replaces a word in the transcript with a different word and the surrounding words are correct, then the replacement is a substitution error. For example, if the transcript is "the sky is blue" and the hypothesis is "the pie is blue," then the replacement of the word "sky" with the word "pie" is a substitution error.

The insertion, deletion, and substitution errors may occur consecutively. For example, the hypothesis "the blue" contains two deletion errors and the hypothesis "the pie as blue" contains two substitution errors. Where a substitution error occurs in sequence with an insertion or deletion error, the type of error assigned to a word may vary. For example, the hypothesis "the sighs blue" contains a deletion error and a substitution error that could be characterized as deleting "sky" and substituting "sighs" for "is" or characterized as deleting "is" and substituting "sighs" for "sky." In this situation, one characterization could be chosen arbitrarily or could be based on further analysis of the hypothesis.

Probabilities are calculated based on the presence or absence of subword units in the processed recording when compared to the correct transcription of the recording. Still further aspects of the disclosure relate to using the computed probabilities to discriminatively train a language model. The probabilities are used to generate erroneous transcriptions, and the language model is trained to distinguish the erroneous transcriptions from the correct transcriptions.

Although aspects of the embodiments described in the disclosure will focus, for the purpose of illustration, on a computing system for generating confusion probabilities from acoustic model training data, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

Various aspects of the disclosure will now be described with regard to certain examples and embodiments, which are intended to illustrate but not limit the disclosure. With reference to one illustrative example, acoustic model (AM) training data, including speech recordings and known correct transcriptions of the speech recordings, is obtained. A computing device aligns the speech recordings with the correct transcriptions such that each word and/or subword unit represented by the recording is aligned with the corresponding portion of the correct transcript. Next, the computing device iterates through each subword unit of a language, such as English, identifying every frame of the recording that is aligned with an instance of the subword unit in the correct transcript. The computing device computes a probability that each frame is recognized as the correct subword unit and that each frame is recognized as each incorrect subword unit. The probabilities are then normalized and used to generate confusion errors with which to train a language model.

In another illustrative example, the speech recordings are processed by a recognizer which generates recognition lattices of candidate transcripts, or hypotheses, for the speech recording. A computing device computes a probability for each path through the lattice, and then aligns each path with the correct transcript. The computing device accumulates, for each path in comparison with the correct transcript, probabilities associated with substitutions, insertions, and deletions of subword units. From the accumulated totals, the computing device computes substitution, insertion, and deletion probabilities for each subword unit of the language, and then uses the probabilities to generate confusion errors with which to train a language model.

For clarity in the following description, embodiments will be described using phonemes as the subword units. The embodiments, however, are not limited to using phonemes as the subword units, and any other subword units known to one of skill in the art may be used in place of phonemes.

Language Model Discriminative Training Overview

Prior to describing embodiments of the confusion matrix generation process in greater detail, an example process for discriminatively training a language model using a confusion matrix will be described. Typically, discriminative training of a language model begins by obtaining a language model training corpus that contains potentially thousands or millions of utterances. From this training corpus, a set of incorrect but confusable alternate hypotheses may be generated. Using the language model, probabilities are generated for the correct transcription and each alternate hypothesis. For a given input into the speech recognition system, the probabilities represent the likelihood that each sequence is the correct sequence. To discriminatively train the language model, the language model is configured so that the probabilities generated by the language model more clearly distinguish the known correct transcription from the confusable alternate hypotheses. The language model may then more accurately generate results for real-world input that does not have a previously known correct transcription.

Figure 1:
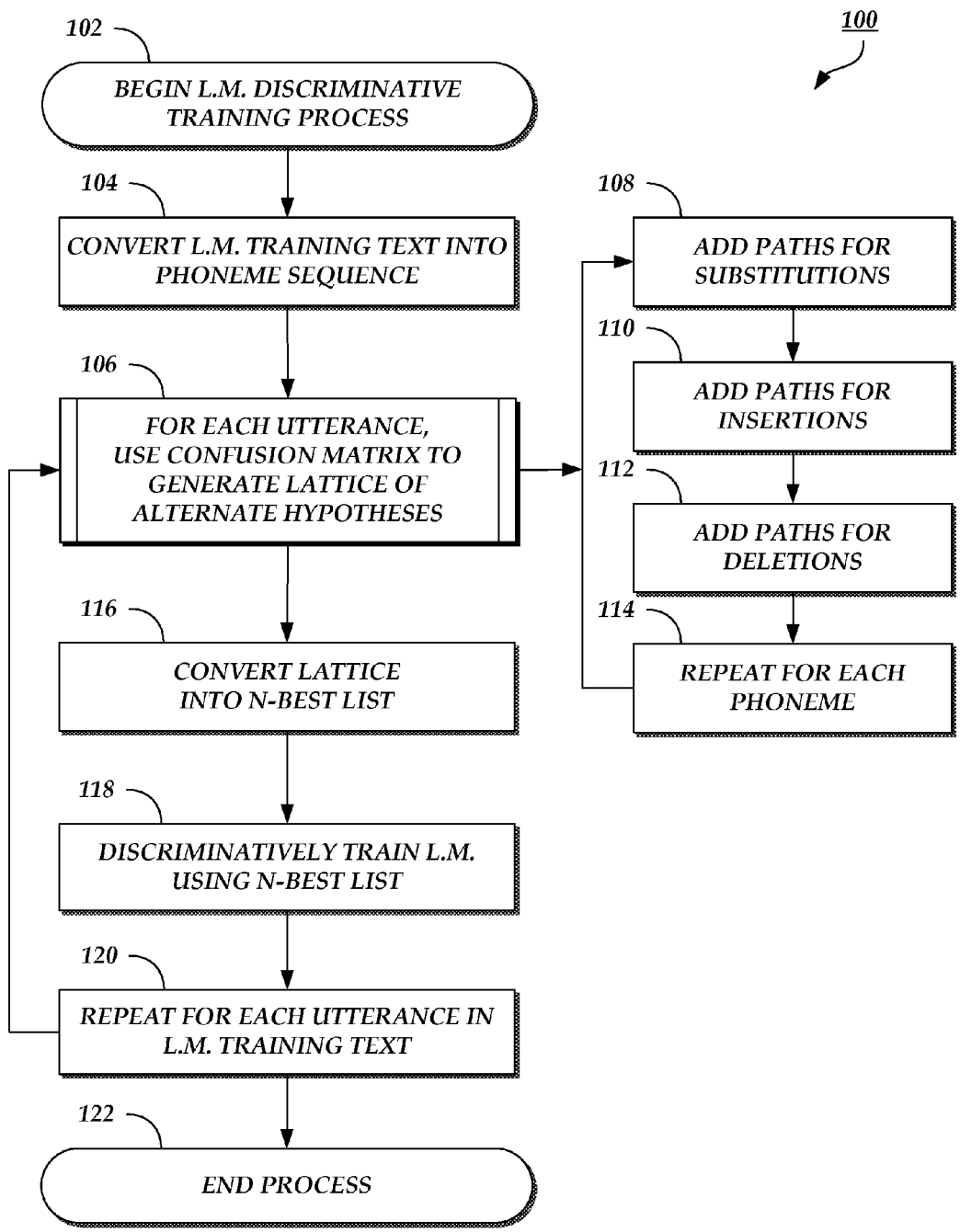
FIG. 1 is a flow diagram of an illustrative process for discriminative training of a language model.

FIG. 1 illustrates a process 100 for generating alternate hypotheses with which to discriminatively train a language model. A computing device 500, as described below with respect to FIG. 5, may be configured to execute the process 100. The process 100 begins at block 102. The process 100 may be an interactive process initiated on-demand by a user or an automated process, such as might be executed on a periodic or aperiodic schedule. In one example, a speech recognition system developer obtains a large amount of text for use as language model (LM) training data, and uses the process 100 to discriminatively train a language model prior to using the language model in a speech recognition system. In some cases, the process 100 may be used to discriminatively train a language model that has already been trained, either by the process 100 or by some other process.

At block 104, the LM training data is converted into a phoneme sequence. The conversion can be facilitated by a lexicon or spelling-to-sound rules that define which phonemes make up each word in a language, or a subset of words in the language. By comparing the words in the LM training data to the spelling-to-sound rules, a known correct phoneme sequence can be generated for each utterance of the LM training data. The conversion can be performed on a portion of the LM training data, such as a sentence or utterance, before proceeding to subsequent blocks of the process 100, or the entire LM training data can be converted into a phoneme sequence or set of phoneme sequences. In some embodiments, a subset of the LM training data can be converted into a phoneme sequence before proceeding to the subsequent blocks of the process 100. The remainder of the LM training data can then be converted at block 104 in parallel with the execution of the subsequent blocks of the process 100 on the previously converted subset of LM training data.

At block 106, the process 100 may use a confusion matrix to generate alternate recognition hypotheses which may be used to discriminatively train the language model. Returning to the example above, the known correct phoneme sequence generated in block 104 forms the basis of a lattice of alternate hypotheses. A confusion matrix may be used to add alternate paths to the correct phoneme sequence for phonemes that may be erroneously inserted into or deleted from a recognized utterance, and for phonemes that may be substituted for the correct phonemes. The probabilities from the confusion matrix may be included in the alternate paths. In some embodiments, every possible substitution, insertion, and deletion is added to the correct phoneme sequence. In other embodiments a subset of all possible confusions are added, such as only those substitutions, insertions, and deletions associated with a probability exceeding a threshold, or only the substitutions, insertions, and deletions associated with the top N probabilities, where N can be any predetermined or dynamically determined number. Other configurations are possible.

For example, at block 108 a confusion matrix may be used to add paths to the correct phoneme sequence. The paths added in block 108 are paths for phoneme substitutions, such as adding phoneme B at the position in the correct phoneme sequence where phoneme A is located, along with the corresponding probability that phoneme B will be erroneously substituted for phoneme A. At block 110, paths are added to the correct phoneme sequence for inserted phonemes. For example, the correct phoneme sequence may be A, B, C, D. A path can be added to the correct phoneme sequence to create the alternate phoneme sequence A, E, B, C, D. The corresponding probability that a phoneme recognizer will erroneously insert phoneme E into a phoneme sequence may also be included. Paths can be added to the lattice at block 112 for deleted phonemes, similar to the paths added for inserted phonemes described above. Returning to the previous example, the correct phoneme sequence may be A, B, C, D. A path can be added to create the alternate phoneme sequence A, C, D, along with the corresponding probability that a phoneme recognizer will omit phoneme B in a phoneme sequence.

As shown in block 114, the operations described with respect to blocks 108, 110, and 112 can be repeated for each phoneme in the correct phoneme sequence. For example, the first phoneme of the correct phoneme sequence may be analyzed, and all alternate paths related to that phoneme may be added to the lattice before proceeding to the second phoneme. The operations of blocks 108, 110, and 112 may then be repeated for each subsequent phoneme in the correct phoneme sequence. After all appropriate alternate paths have been added to the correct phoneme sequence, a lattice may be generated. The correct phoneme sequence and alternate paths may be processed such that only those paths which form words of a language are retained and added to the lattice.

At block 116, the lattice generated in block 106 may be converted into an N-best list. In the context of the process 100, the N-best list may be a set of discrete phoneme sequences that are most likely to be confused for the correct phoneme sequence. The probability of each possible path through the lattice is determined, and paths are selected for inclusion in the N-best list. There may be any number of lattice paths included the N-best list, i.e.: N may be any number. In some embodiments, the process 100 selects a predetermined number of lattice paths for inclusion in the N-best list, or the process 100 may select a predetermined percentage of all lattice paths generated by block 106. In some embodiments, only lattice paths associated with a probability exceeding a threshold are included in the N-best list, and therefore the size of the N-best list may vary from one execution of the process 100 to another.

At block 118, the N-best list is used to discriminatively train the language model. The implementation of the discriminative training may vary, and any discriminative training technique utilizing an N-best list of alternate phoneme sequence hypotheses may be used. One such technique is detailed in Kurata et. al., "Acoustically Discriminative Language Model Training with Pseudo-Hypothesis," Speech Communication 54 (2012) 219-228, the contents of which are hereby incorporated by reference.

As shown in block 120, the previously described process may be repeated for every utterance in the LM training data. In the example above, the LM training data may be separated into utterances, with each utterance corresponding to a subset of the LM training data, such as a sentence or other logical separation. Separating the LM training data into subsets can help to prevent the lattice that is generated in block 106 from becoming too large to work with effectively. In some embodiments, larger amounts of text may be processed in a single execution of the previously described blocks, up to and including the entire LM training corpus.

Confusion Matrix Generation Process

Figure 2A:
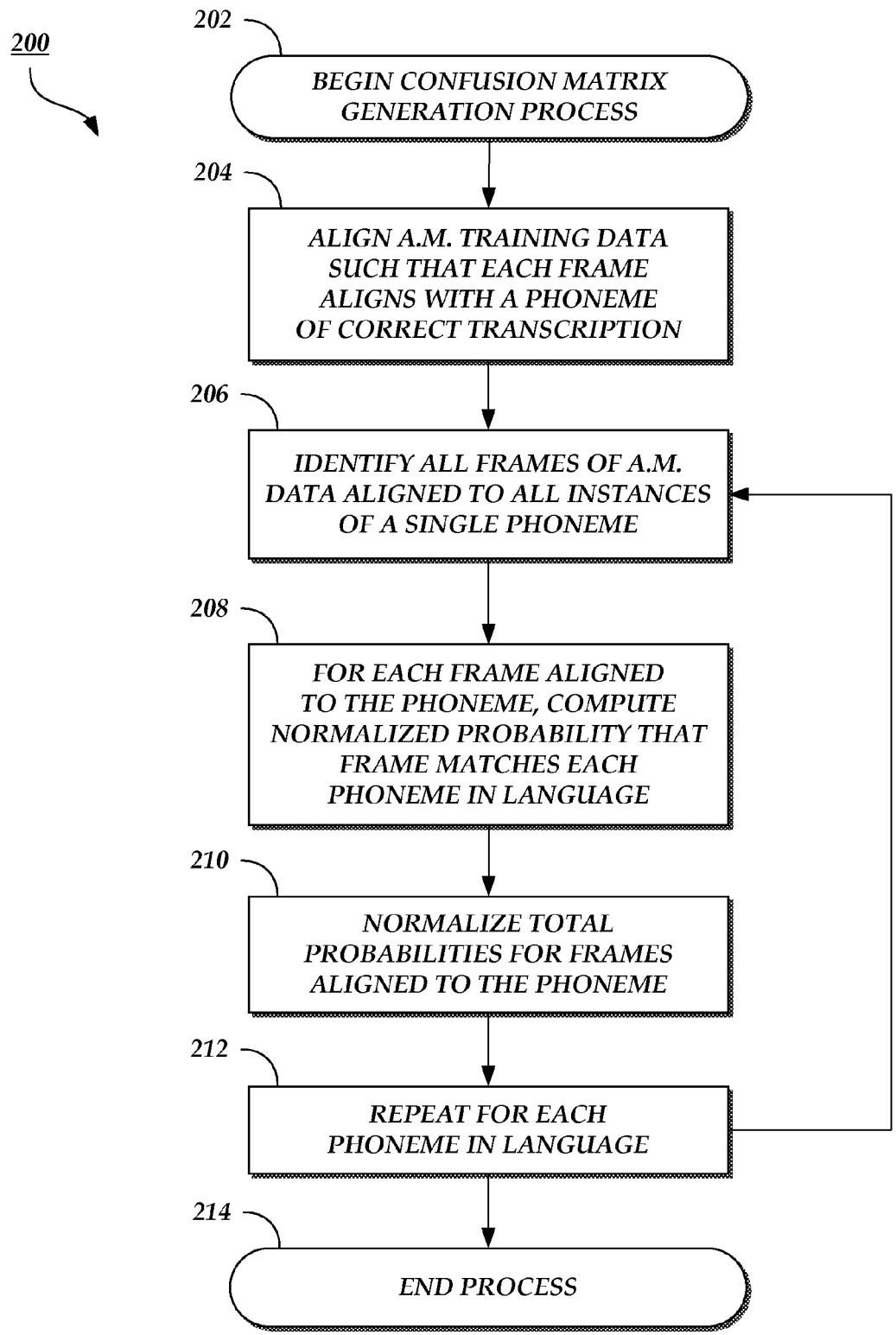
FIG. 2A is a flow diagram of an illustrative process for generating a confusion matrix for phoneme substitution (a→b).

FIG. 2A illustrates a sample process 200 for generating a confusion matrix. Confusion matrices generated with the process 200 may be used in language model discriminative training processes, such as the process 100 described above with respect to FIG. 1. Specifically, at block 106 of FIG. 1, a confusion matrix generated by the process 200 described below can be used to generate alternate hypotheses by adding likely confusable substitute phonemes to the correct phoneme sequence. The process 200 described below with respect to FIG. 2A generates a confusion matrix from acoustic model (AM) training data. The benefit of using AM training data to generate the confusion matrix is that the probabilities of confusion are then based on the AM training data itself, including recorded utterances and correct transcriptions, rather than being based exclusively on the acoustic model or some abstraction of the AM training data.

The process 200 begins at block 202. A computing device 500, as described below with respect to FIG. 5, may be configured to execute the process 200. The process 200 may be an interactive process initiated on-demand by a user or an automated process executed on a schedule. In one example, a speech recognition system developer obtains an audio recording of one or more utterances, or data regarding extracted features of the utterances, and a corresponding correct transcription of the utterances. The audio recording can be divided into frames, such that each phoneme of the correct transcription encompasses one or more frames of the audio recording. As a result, each frame of the audio recording may correspond to only one phoneme of the correct transcription. In some embodiments, each frame contains a 10 ms portion of the audio recording. In some embodiments, frames may be assigned to phonemes probabilistically and each frame may correspond to one or more phonemes with a determined probability.

Figure 2B:
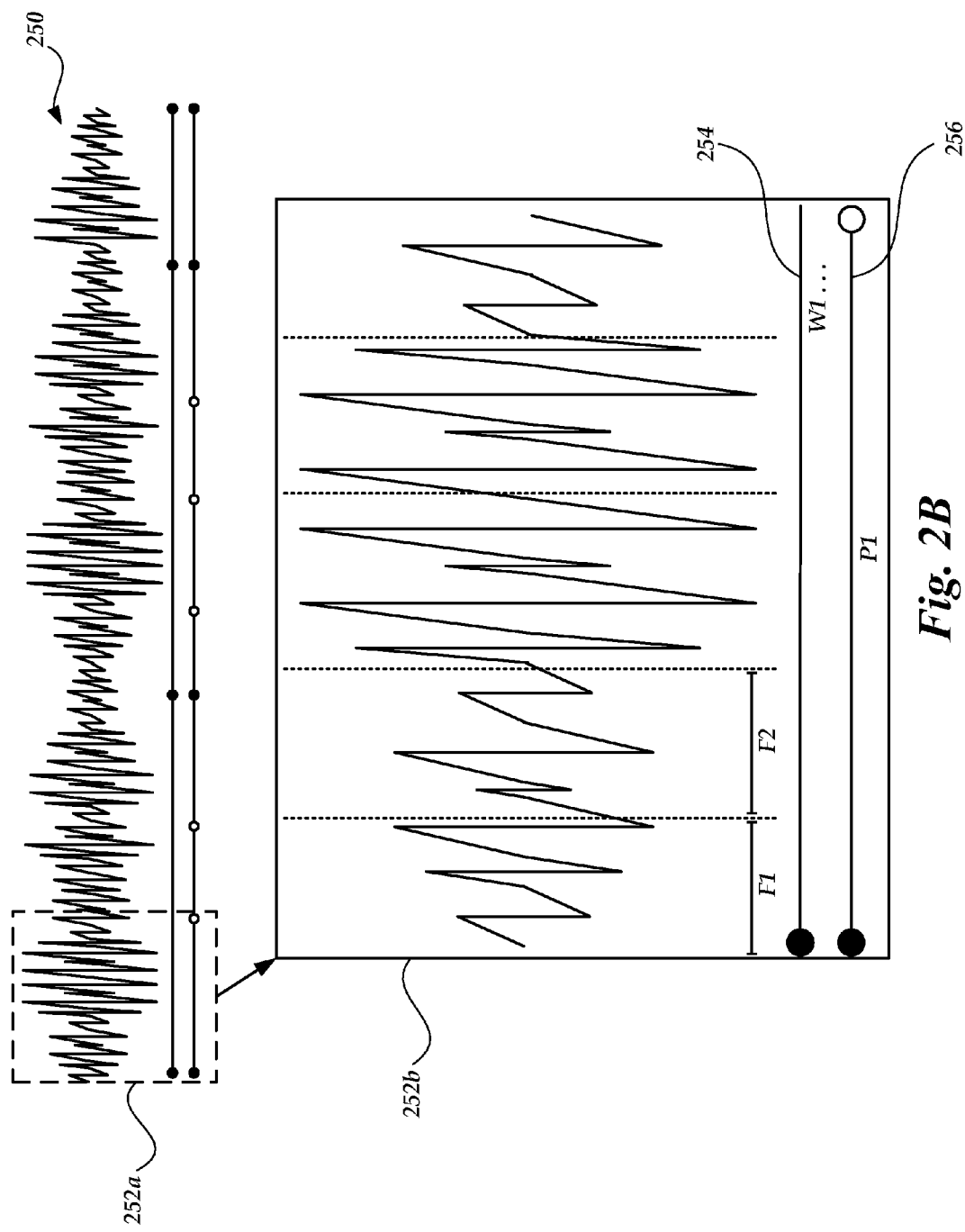
FIG. 2B is a waveform diagram of an illustrative acoustic model training data waveform aligned with a corresponding correct transcription, as used in the process of FIG. 2A.

At block 204, the frames of the acoustic model training data are aligned with the correct transcription, such that collection of frames that define a phoneme are aligned with the corresponding phoneme of the correct transcription. FIG. 2B illustrates an example visualization of this operation. The waveform 250 is an acoustic model training data waveform. The waveform portion 252*a* corresponding to one phoneme has been zoomed for greater detail. As shown in the zoomed portion 252*b*, the phoneme described by the waveform portion encompasses multiple frames, including frames F1 and F2 as shown. The frames are aligned with a word transcription 254 and a phonetic decomposition 256 of the word transcription 254. The phonetic decomposition 256 may be generated by applying a lexicon or word-to-phoneme rules to the word transcription 254. The phoneme P1 described by the waveform portion is the first phoneme of the utterance, and is part of the first word W1 of the correct transcription. As shown in the zoomed out view of the waveform, subsequent portions of the waveform 250 are aligned with subsequent phonemes and words of the correct transcription.

In operation, a computing device executing the process 200 may not generate any visual alignment analogous to FIG. 2B. Instead, data describing the waveform and its component frames can be analyzed to determine an alignment with the correct transcription. In some embodiments, a Viterbi alignment may be used to perform an alignment of the frames with the transcription, and the alignment may be stored in a storage medium in formats known to one of skill in the art.

Returning to FIG. 2A, at block 206 the frames corresponding to each instance of a phoneme are identified. For example, there may be approximately 40 phonemes in the English language. At block 206, a phoneme is selected, and each frame in the AM training data recording corresponding to each instance of the phoneme in the AM training data transcription is identified. The frames are identified so that probability calculations can be made in block 208.

At block 208, a set of probability calculations may be created for each frame identified in block 206. Specifically, a separate probability is calculated for each phoneme of the language. For example, each frame associated with phoneme 1 of the English language has a probability calculated which represents the likelihood that the frame corresponds to each phoneme of the English language. Assuming there are 40 phonemes in the English language, each frame may be associated with up to 40 separate probability calculations, including one for the correct phoneme corresponding to the frame and one for some or all of the incorrect phonemes which do not correspond to the frame. The calculated probabilities may then be summed, and each individual probability divided by the sum to determine a set of normalized probabilities that the frame corresponds to phonemes in the language. In the current example, the result may be that each frame is associated with 40 separate probabilities that sum to 1.

At block 210, the set of probabilities generated in block 208 may be normalized. For example, each frame aligned with phoneme 1 of the English language may have 40 separate normalized probabilities associated with it, calculated according to block 208 above. Assuming there are thousands (or more) of frames aligned with phoneme 1, there can be thousands of probabilities summed for each phoneme of the language, including the correct phoneme with which the frames are aligned and all incorrect phonemes. The thousands of probabilities may be summed to calculate a subtotal for the correct phoneme and a separate subtotal for each incorrect phoneme. The subtotals may then be summed to calculate a total of all probabilities associated with all frames aligned with the phoneme. Finally, each subtotal may be divided by the number of frames in order to obtain a set of normalized probabilities for the phoneme.

At block 212, the process returns to block 206 for each phoneme in the language. For example, if the language for which the confusion matrix generation process 100 is being executed has 40 phonemes, the process 100 will return to block 206 39 times so that probabilities can be calculated for each of the 40 phonemes. As described above with respect to block 210, 40 probabilities are generated during each iteration of blocks 206, 208, and 210, with the result being a normalized probability of confusion for each phoneme in the language with respect to all of the other phonemes in the language. The confusion matrix comprises the 40 separate probabilities calculated for each of the 40 phonemes. One way to visualize the confusion matrix is as an N×N chart of probabilities, where N is the number of phonemes in the language. Accordingly, a confusion matrix for a language with 40 phonemes can be represented by a 40×40 matrix.

The computations of process 200 may be performed in sequences other than as described in FIG. 2A. For example, instead of iterating over the phonemes of the language in blocks 206, 208, 210, and 212, one could instead iterate over the frames of the training data and accumulate statistics that can be used to compute the confusion matrix.

Figure 2C:
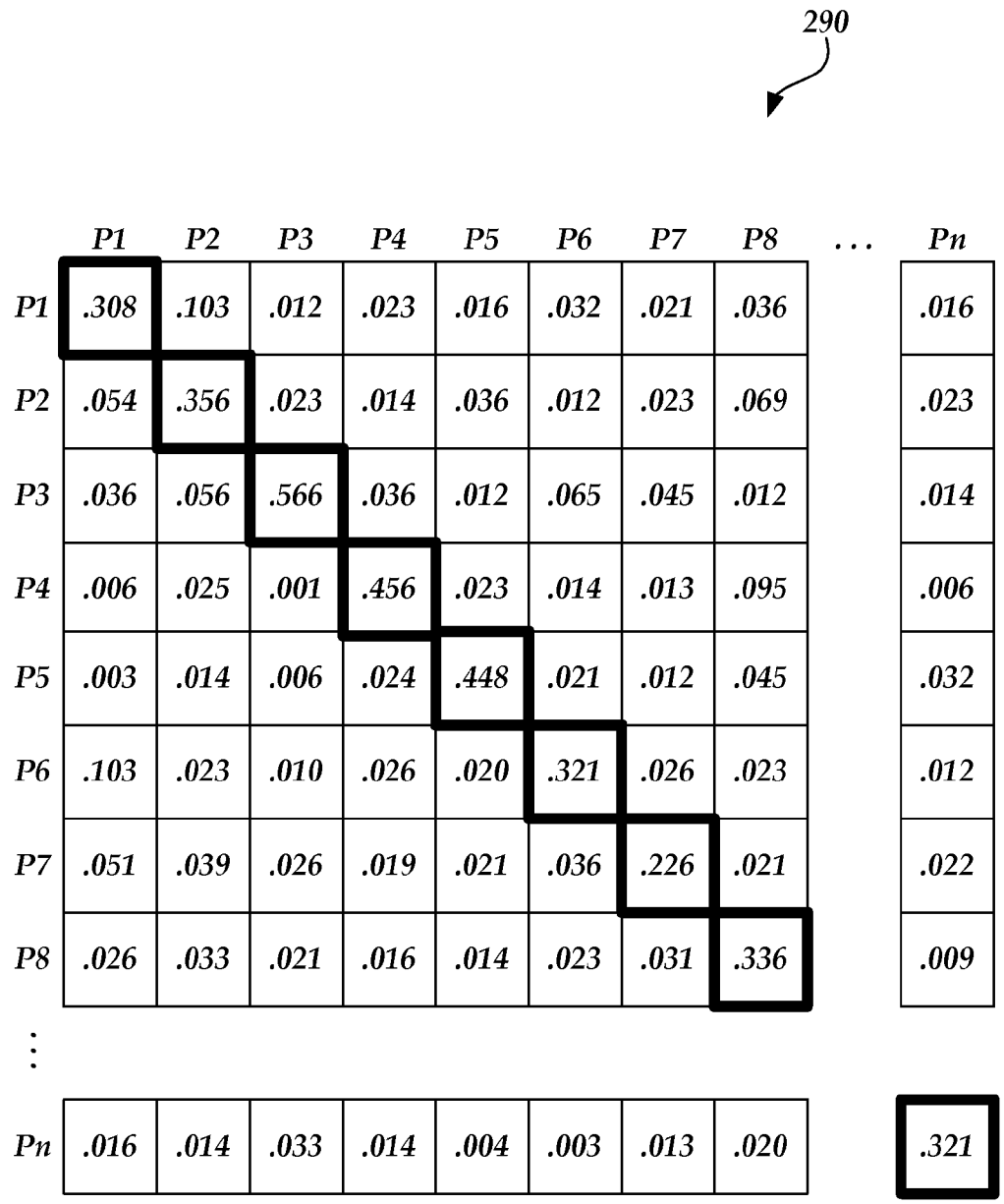
FIG. 2C is an illustrative confusion matrix generated by the process of FIG. 2A.

FIG. 2C illustrates one such visualization of a confusion matrix 290. Each phoneme is displayed on both the horizontal and vertical axes. The normalized probability of confusion for each phoneme listed down the left side of the matrix 290 (the vertical or y-axis) with respect to each phoneme listed across the top (the horizontal or x-axis) is displayed within the matrix 290 at the intersection of the two phonemes. Note that probabilities in the top-left to bottom-right diagonal, outlined in bold, correspond to the correct probabilities, i.e., the likelihood that a frame from a phoneme will be determined to be the correct phoneme of the language. Accordingly, the remainder of the probabilities in the matrix 290 correspond to likelihoods that a frame from a phoneme will be determined to be an incorrect phoneme of the language. For embodiments using the normalization 210, the probabilities in the columns of the matrix will sum to 1. In some embodiments, the matrix 290 may include additional information, such as insertion probabilities calculated as described in detail below with respect to FIG. 3A. In some embodiments, a matrix such as the matrix 290 illustrated in FIG. 2C is not constructed. Instead, the probabilities generated by the process 200 are stored in a data store, such as a database, without regard to any visual layout.

Insertion and Deletion Probability Generation Process

Figure 3A:
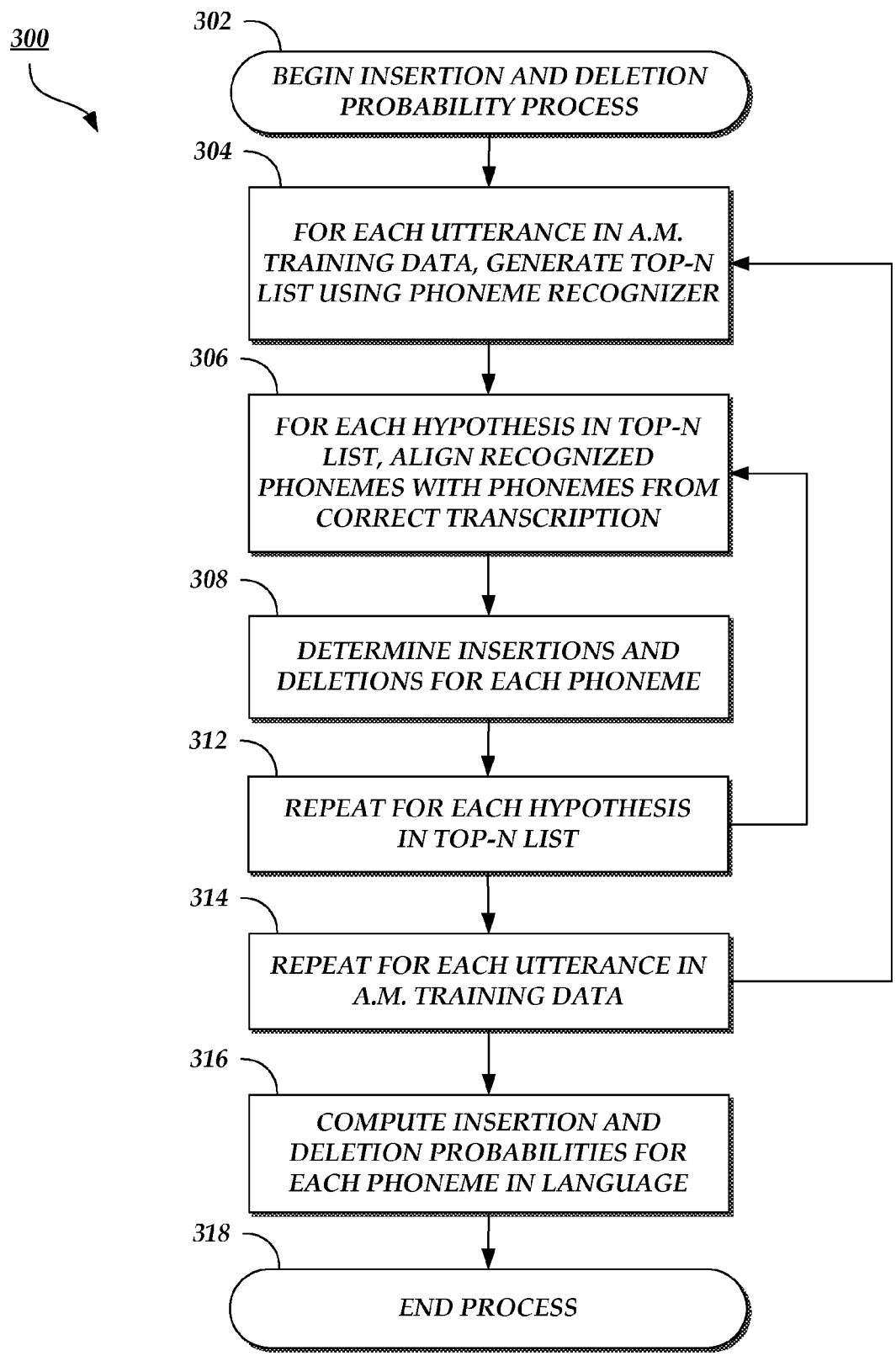
FIG. 3A is a flow diagram of an illustrative process for generating insertion and deletion probabilities.

FIG. 3A illustrates a sample process 300 for generating insertion and deletion probabilities for phonemes. In some embodiments, insertion and deletion probabilities generated with the process 300 may be used, along with the confusion probabilities generated in the process 200 described above, in a language model discriminative training processes, such as the process 100 described above with respect to FIG. 1. Specifically, at block 106 of FIG. 1, the insertion and deletion probabilities generated by the process 300 described below can be used to generate alternate hypotheses by adding paths to the correct phoneme sequence for insertions (block 110) and deletions (block 112).

The process 200 may be used to estimate insertion and deletion probabilities by associating them, e.g., with the overlap of the silence phoneme with the phonemes of the language. However, process 300 may be a more accurate way of estimating these probabilities.

The process 300 described below with respect to FIG. 3A generates insertion and deletion probabilities from the AM training data. The insertion and deletion probabilities may be determined based on an analysis of the top-N most likely transcriptions for each utterance of the AM training data audio. Each of the top-N most likely transcriptions is compared to the correct transcription, the number of insertions and deletions for each phoneme are counted, and probabilities are computed based on those counts.

The process 300 begins at block 302. A computing device 500, as described below with respect to FIG. 5, may be configured to execute the process 300. The process 300 may be an interactive process initiated on-demand by a user or an automated process executed on a schedule. In one example, a speech recognition system developer obtains a recording of one or more utterances, or data regarding extracted features of the utterances, and a corresponding correct transcription. The recording may be separated into a number of utterances, for example by isolating each sentence or other logical separation.

At block 304, an utterance or some other portion of the AM training data audio recording may be analyzed by a phoneme recognizer in order to generate a top-N list of likely phonetic transcriptions. In some embodiments, the utterance may be analyzed instead by a word recognizer to generate a top-N list of likely word transcriptions, and the words are then decomposed into phonemes for the remainder of the analysis.

Figure 3B:
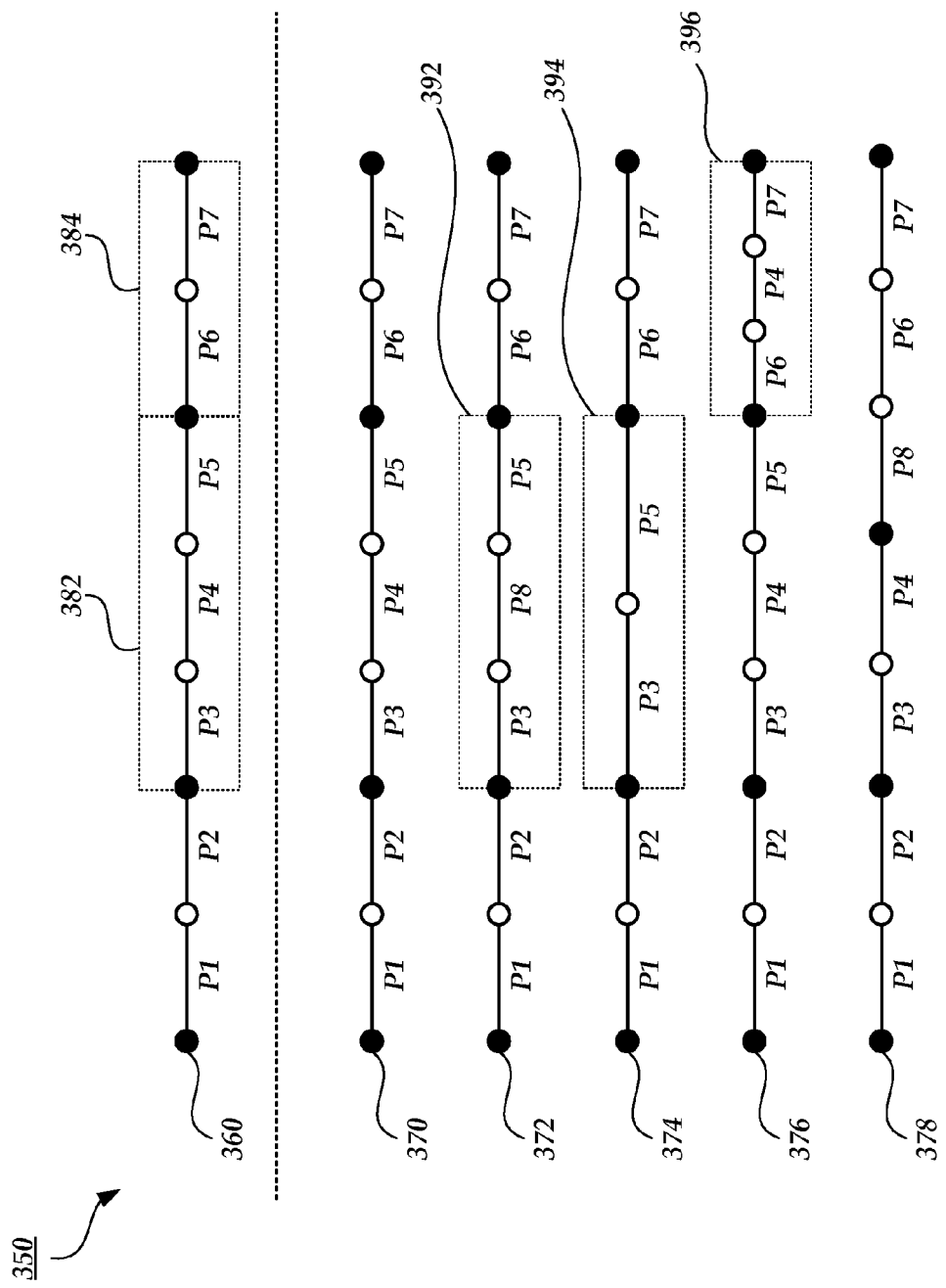
FIG. 3B is a phoneme diagram of an illustrative N-best list used during the process of FIG. 3A.

At block 306, one or more of the top-N hypotheses generated by the phoneme recognizer are aligned with the correct phonetic transcription. Alignment of the hypotheses with the correct transcription facilitates the counting of insertions and deletions for each phoneme at block 308. FIG. 3B illustrates a visual representation of an alignment 350 of several hypotheses with a correct phonetic transcription. The correct transcription 360 can be seen at the top of the alignment 350, and consists of seven phonemes numbered P1 to P7, each separated by a point. The phonemes combine to form three words, with each word separated by a black point, and the phonemes which make up each word separated by a white point. The phoneme recognizer may not be configured to group phonemes into words, and therefore the output may be visualized as separated by only black points. Optionally, a word recognizer may be used to group the output from the phoneme recognizer into words in such cases.

The illustrative alignment 350 includes the top-5 hypotheses 370, 372, 374, 376 and 378. In general, the hypotheses of the top-N list generated by the phoneme recognizer may contain different phonemes than the correct transcription 360, as seen in hypotheses 372 and 378. Some hypotheses, such as hypothesis 374, may contain fewer phonemes, while others, such as hypothesis 376, may contain more phonemes. Finally, the top-N list may include a hypothesis that is identical to the correct transcription 360, such as hypothesis 370.

At block 308 of the process 300, the insertions and deletions of phonemes in the top-N hypotheses are determined. This may be accomplished by calculating the Levenshtein distance between the correct transcription and each of the top-N hypotheses, as will be appreciated by one of skill in the art. When the operations associated with block 308 are executing, each position of a hypothesis in the top-N list is compared to the corresponding position of the correct transcription 360 with which it is aligned. For each position, the absence of a phoneme from the correct transcription 360 or presence of a phoneme that is not in the correct transcription 360 is observed and counted. Note that this operation is different than determining which phonemes may be substituted for phonemes in the correct transcription 360.

As seen in hypothesis 372, phoneme P4 is not present in section 392, while phoneme P4 is present in section 382 of the correct transcription 360. However, phoneme P4 is not considered to have been deleted from hypothesis 372, but rather phoneme P8 is substituted for phoneme P4. One way to determine such a substitution is by observing the phonemes immediately preceding and following the phoneme in question. In hypothesis 372, phoneme P8 is preceded by phoneme P3 and followed by phoneme P5, which are aligned with phonemes P3 and P5 in the correct transcription. Phoneme P8 in hypothesis 372 is aligned with phoneme P4 in the correct transcription 360, between phonemes P3 and P5. Therefore, phoneme P8 had been substituted for phoneme P4, and phoneme P4 will not be counted as being deleted from hypothesis 372.

In some embodiments, the process 300 may be used to record data about such substitutions instead of, or in addition to, the process 200 described above with respect to FIG. 2A. For example, each time P8 is substituted for phoneme P4, a count is incremented and later a confusion probability may be calculated that represents the likelihood that an audio input for phoneme P4 is incorrectly recognized as phoneme P8. In this manner, a confusion matrix may be generated and used for discriminative training of a language model as set forth above.

Turning now to hypothesis 374, phoneme P4 is considered to be deleted from section 394 when compared to section 382 of the correct transcription 360. One way of determining that a phoneme is deleted in an alternate hypothesis is by comparing the phonemes preceding and following the phoneme in the correct transcription, and determining whether those same phonemes are present in the hypothesis and would be aligned in the same position within the phoneme sequence if the missing phoneme had not been deleted. As shown in section 394, phonemes P3 and P5 are present, and both would be aligned with the corresponding phonemes P3 and P5 of the correct transcription 360 if a phoneme had not been deleted from between them. Therefore, phoneme P4 is considered to be deleted from hypothesis 374. During execution of the process 300, phoneme P4 will be counted as being deleted once when the operations of block 308 analyze hypothesis 374.

In some embodiments, a posterior probability for each hypothesis, including hypotheses 374, may be calculated as described below with respect to FIG. 4A. In the current example, the posterior probability calculated for hypothesis 374 can be added to a total deletion probability for phoneme P4. In some embodiments, context data may be recorded to allow deletion probabilities for each phoneme to be determined with respect to deletions before, after, or between specific phonemes. For example, the deletion may be recorded as a deletion immediately following an instance of phoneme P3. Alternatively, the deletion may be recorded as a deletion immediately preceding an instance of phoneme P5, or as a deletion between instances of phonemes P3 and P5.

In hypothesis 376, phoneme P4 is considered to be inserted into section 396 when compared to the section 384 of the correct transcription 360 with which it is aligned. One way of determining that a phoneme is inserted into an alternate hypothesis is by comparing the phonemes preceding and following the phoneme in the correct transcription, and determining whether those same phonemes are present in the hypothesis and would be aligned in the same position within the phoneme sequence if the inserted phoneme had not been inserted. As shown in section 396, phonemes P6 and P7 are present, and both would be aligned with the corresponding phonemes P6 and P7 of the correct transcription 360 if a phoneme had not been inserted between them. Therefore, phoneme P4 is considered to be inserted into hypothesis 376. During execution of the process 300, phoneme P4 will be counted as being inserted once when the operations of block 308 analyze hypothesis 376.

In some embodiments, a posterior probability for each hypothesis, including hypotheses 376, may be calculated as described below with respect to FIG. 4A. In the current example, the posterior probability calculated for hypothesis 376 can be added to a total insertion probability for phoneme P4. In some embodiments, context data may be recorded to allow a more granular probability determination for each phoneme, similar to the deletion probabilities described above. For example, the insertion may be recorded as an insertion immediately following an instance of phoneme P6. Alternatively, the insertion may be recorded as an insertion immediately preceding an instance of phoneme P7, or as an insertion between instances of phonemes P6 and P7.

At block 312 of FIG. 3A, the process 300 returns to block 306 for each remaining utterance of the top-N list. Returning to the example top-N list of FIG. 3B, the process 300 will return to block 306 four times, so that the each of the five top-N hypotheses may be processed by the operations described above with respect to blocks 306 and 308.

After the operations of blocks 306 and 308 have been executed for each of the top-N hypotheses generated for the present utterance of AM training data, the process 300 then proceeds to block 314. At block 314, the process 300 will return to block 304 and execute the operations described above for the next utterance or subset of AM training data and each remaining utterance or subset of AM training data. As a result, insertion and deletion counts are totaled for each alternate hypothesis generated by the operation of the phoneme recognizer on the AM training data audio, and may number in the thousands or millions, depending on the volume of AM training data.

The computations of process 300 may be performed in sequences other than as described in FIG. 3A. For example, instead of iterating over the utterances of the acoustic model training data in blocks 304, 306, 308, 312, and 314, one could instead iterate over phonemes and compute insertion/deletion probabilities for one phoneme before moving on to the next phoneme.

At block 316, the insertion and deletion probabilities are calculated for each phoneme in the language. For example, if the language is English and there are 40 English language phonemes, a total of 80 probabilities may be calculated at block 316: one insertion probability and one deletion probability for each of the 40 phonemes. In operation, the total insertion probability for each phoneme, as determined in block 308, can be divided by the total posterior probability for all hypotheses of the top-N list to determine a normalized insertion probability for each phoneme. The process may be repeated for deletion probabilities.

Probability Generation Process Utilizing Lattices

FIG. 4A illustrates another embodiment of a process 400 for generating confusion probabilities. Specifically, the process described below can be used to generate substitution, insertion, and deletion probabilities, and therefore the process 400 may be used instead of or in addition to the processes described above with respect to FIGS. 2A and 3A. The confusion probabilities generated by the process 400 may be used in language model discriminative training processes, such as the process 100 described above with respect to FIG. 1. Specifically, at block 106 of FIG. 1, the substitution, insertion, and deletion probabilities generated by the process 400 described below can be used to generate alternate hypotheses by adding paths to the correct phoneme sequence for substitutions (block 110), insertions (block 112), and deletions (block 114).

Similar to the processes described above with respect to FIGS. 2A and 3A, the process 400 described below with respect to FIG. 4A generates substitution, insertion, and deletion probabilities from the AM training data. The confusion probabilities are determined based on an analysis of a recognition lattice returned from a phoneme or word recognizer when AM training data is processed by a recognizer, such as a phoneme recognizer or a word recognizer. The recognition lattice, which may be implemented as a directed acyclic graph, includes a number of alternate hypotheses as paths of the lattice, and each path may be separated into words and phonemes. The words and phonemes are associated with probabilities, and those probabilities form the basis of the calculations of the process 400. Specifically, the probabilities of each phoneme may be summed over each path of the lattice to compute a posterior probability for each path. The process 400 then aligns the transcription of each path with the correct transcription, and sums the individual substitution, insertion, and deletion probabilities for each phoneme of the correct transcription. This data is then used to generate a confusion matrix.

The process 400 begins at block 402. The process 400 may be an interactive process initiated on-demand by a user or an automated process executed on a schedule. In one example, a speech recognition system developer obtains recordings of one or more utterances, or data regarding extracted features of the utterances, and a corresponding correct transcription. The recordings may be separated into a number of utterances, for example by isolating each sentence or other logical separation.

At block 404, an utterance is processed by a phoneme recognizer or a word recognizer in order to generate a lattice of hypotheses. The recognition lattice typically includes several paths, with each path representing one hypothesis or candidate transcription of the processed utterance. Each path is composed of segments corresponding to words that make up the hypothesis. In addition, each segment is associated with a probability that the segment is a correct transcription of the corresponding portion of the processed utterance. Hypotheses generated by a word recognizer may include appropriate subword units. If not, a lexicon or word-to-phoneme rules can be used to determine which phonemes make up the words in the lattice.

FIG. 4B illustrates an example recognition lattice 450 generated by the operations of block 404. The lattice 450 includes several paths, with each path consisting of multiple words. Each word in the lattice 450 is composed of multiple phonemes. Each path through the example lattice 450 can represent one hypothesis of the example top-N list of FIG. 3B, with words separated by black points and phonemes within words separated by white points. Any number of paths may be generated by the recognizer, and the number of words per path and phonemes per word can vary substantially, depending on the audio recording that is processed. For example, if the audio recording is short, a path through a lattice generated by the operations of block 404 may contain one word.

At block 406, the process 400 computes the posterior probability for each path through the lattice. The posterior probability represents the overall probability that the path is the correct transcription of the utterance for which the process 400 generated the lattice. Returning to example lattice 450 of FIG. 4B, one path of the lattice consists of words 460 and 464. Word 460 is composed of phonemes P1 and P2, while word 464 is composed of phonemes P3 and P4. Depending on the implementation, each word or phoneme is associated with a probability. To calculate the posterior probability of the path defined by words 460 and 464, the probabilities of the phonemes (or words) are multiplied across the entire path. For example, assuming phoneme P1 is associated with a probability of $X_1$, P2 with a probability of $X_2$, P3 with a probability of $X_3$, and P4 with a probability of $X_4$, the total probability of the path is the product $X_1*X_2*X_3*X_4$. This operation is repeated for each path through the lattice 450. When a product for each path has been computed, the products are added together to compute a total for the lattice 450. The total probability associated with each path may then be normalized over the total for the lattice 450. Returning to the previous example, the total probability associated with the path defined by words 460 and 462 ($X_1*X_2*X_3*X_4$) is placed in the numerator and the total for the lattice 450 is placed in the denominator, with the resulting ratio representing the normalized probability for the path.

The normalized probability for the path may be assigned to each segment of the path. In the example above, the normalized probability for the path is assigned to both word 460 and word 464. Due to the structure of the lattice 450, each segment may be, and typically is, part of multiple paths. For example, word 460 partially defines the path of the previous example and, in conjunction with word 466, it defines a separate path. In such cases, the total probability of the segment is the sum of the probabilities for each path that it defines, because a segment which is included in multiple hypotheses has a greater probability of being correct than any individual hypothesis in which it is included.

At block 408, a path of the lattice is selected and its corresponding transcription is aligned with the correct transcription. Returning to the example lattice 450 of FIG. 4B, the path defined by words 460 and 466 is aligned with the correct transcription 470. The correct transcription 470 is defined by word 472 and word 474.

At block 410, confusion probabilities are accumulated based on the alignment from block 408. Returning to the example in block 408, word 472 of the correct transcription 470 is identical to word 460 of the current lattice path. Therefore, there is no substitution, insertion, or deletion to accumulate. However, word 474 of the correct transcription is different than word 466. Specifically, word 474 is composed of phonemes P3 and P4, while word 466 is composed of the single phoneme P4. Accordingly, a deletion of phoneme P3 can be observed and accumulated.

At block 412, the operations of blocks 408 and 410 are repeated for each path through the lattice. As seen in FIG. 4B, the path defined by words 462 and 464 will result in the observation of an insertion of phoneme P3 when compared to the correct transcription 470. In another example, the path defined by the words 460 and 468 will result in the observation of a substitution of phoneme P5 for phoneme P3 when compared to the correct transcription 470. The probabilities assigned to each word are accumulated separately depending on whether a phoneme is observed to be substituted, inserted, or deleted.

At block 414, the process 400 returns to block 404 for each remaining utterance of the AM training data.

Finally, a confusion matrix is generated in block 416 in response to each utterance of the AM training data being processed by the operations of the previously described blocks of process 400. The substitution probabilities for each phoneme, accumulated during block 410 with respect to the correct phoneme and all incorrect phonemes, may be divided by the total posterior probability for all hypotheses of the lattice to determine a normalized substitution probability for each phoneme with respect to all phonemes with which it was aligned. A similar process may be used to determine insertion and deletion probabilities for each phoneme.

Execution Environment

Figure 5:
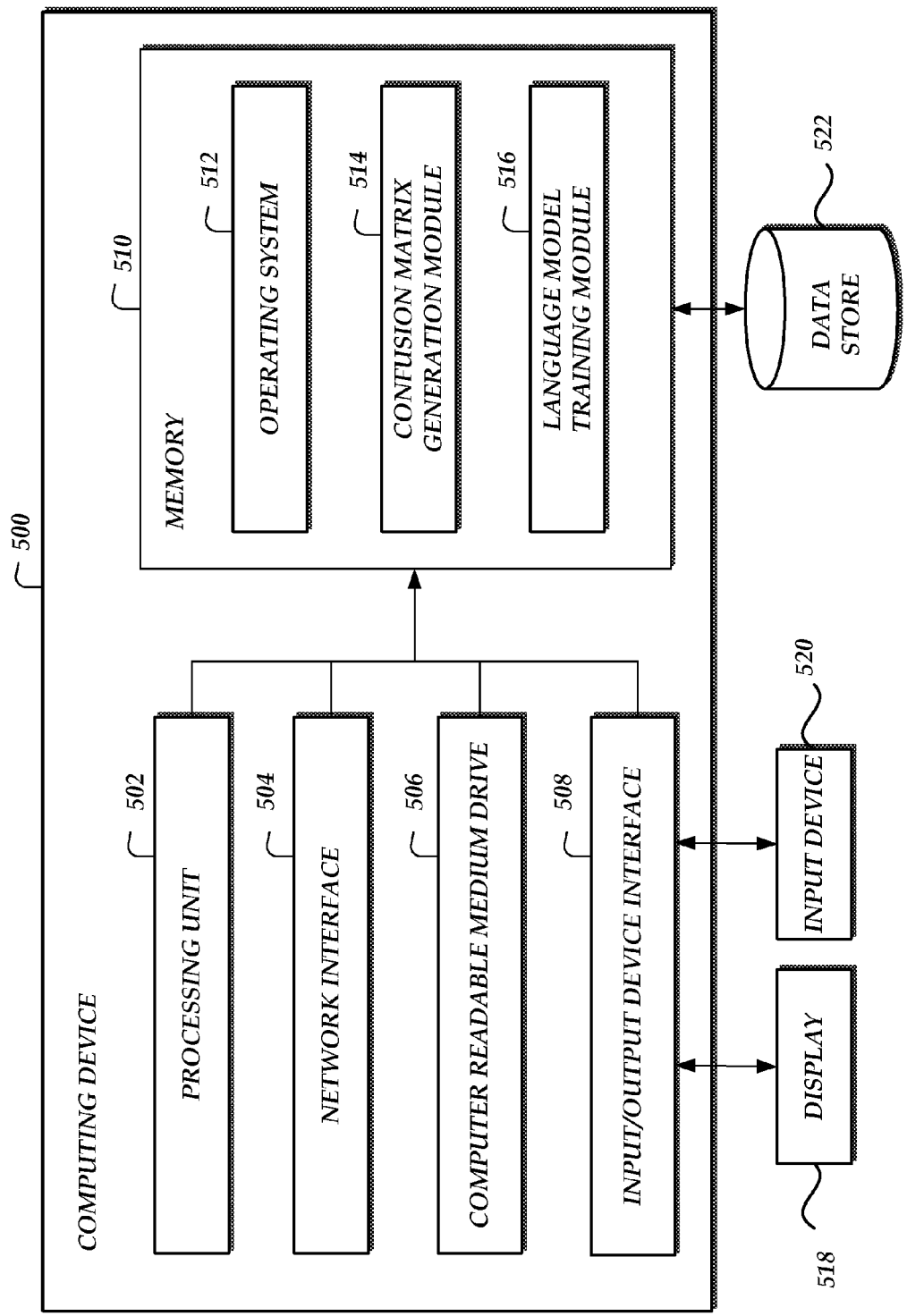
FIG. 5 block diagram of an illustrative computing device configured to execute some or all of the processes and embodiments described herein.

Referring now to FIG. 5, one embodiment of a computing device 500 configured to execute the processes and implement the features described above will be described. The computing device 500 can be a server or other computing device, and can comprise a processing unit 502, a network interface 504, a computer readable medium drive 506, an input/output device interface 508, and a memory 510. The network interface 504 can provide connectivity to one or more networks or computing systems. The processing unit 504 can receive information and instructions from other computing systems or services via the network interface 504. The network interface 504 can also store data directly to memory 510. The processing unit 502 can communicate to and from memory 510 and output information to an optional display 518 via the input/output device interface 508. The input/output device interface 508 can also accept input from the optional input device 520, such as a keyboard, mouse, digital pen, microphone, etc.

The memory 510 contains computer program instructions that the processing unit 502 executes in order to implement one or more embodiments. The memory 510 generally includes RAM, ROM and/or other persistent, non-transitory computer-readable media. The memory 510 can store an operating system 512 that provides computer program instructions for use by the processing unit 502 in the general administration and operation of the computing device 500. The memory 510 can further include computer program instructions and other information for implementing aspects of the present disclosure. For example, in one embodiment, the memory 510 includes a confusion matrix generation module 514 that accepts input in the form of audio recordings and transcriptions, and generates confusion matrices based on such input. In addition to the confusion matrix generation module 514, the memory 510 can include a language model training module 516 that can be executed by the processing unit 502. Memory 510 may also include or communicate with one or more auxiliary data stores, such as data store 522. Data store 522 may electronically store data regarding acoustic models, language models, training data for the acoustic and language models, and the like.

In operation, the computing device 500 loads the confusion matrix generation module 514 and language model training module 516 from the computer readable medium drive 506 or some other non-volatile storage unit into memory 510. Based on the instructions of the confusion matrix generation module 514 and language model training module 516, the processing unit 502 can load data from the data store 522 into memory 510, perform calculations on the loaded data or on data input from the input device 520, and store the resulting confusion matrix and language models in the data store 522.

In some embodiments, the computing device 502 may include additional or fewer components than are shown in FIG. 5. For example, a computing device 502 may include more than one processing unit 502 and computer readable medium drive 506. In another example, the computing device 502 may not include be coupled to a display 518 or an input device 520. In some embodiments, two or more computing devices 500 may together form a computer system for executing features of the present disclosure.

Terminology

Depending on the embodiment, certain acts, events, or functions of any of the processes or algorithms described herein can be performed in a different sequence, can be added, merged, or left out all together (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
   under control of one or more computing devices configured with specific computer-executable instructions,
      generating a recognition hypothesis for acoustic model training data,
         wherein the acoustic model training data is associated with a transcription,
         wherein the recognition hypothesis comprises a sequence of one or more recognized subword units,
         wherein the transcription comprises a sequence of one or more transcribed subword units,
         wherein each recognized subword unit of the sequence of recognized subword units is one of a plurality of language subword units, and
         wherein each transcribed subword unit of the sequence of transcribed subword units is one of the plurality of language subword units;
      comparing the sequence of one or more recognized subword units to the sequence of one or more transcribed subword units;
      determining that the recognition hypothesis comprises one or more deletion errors for a first language subword unit;
      determining that the recognition hypothesis comprises one or more insertion errors for the first language subword unit;
      calculating an insertion probability for the first language subword unit and a deletion probability for the first language subword unit, wherein the insertion probability is based at least in part on the one or more insertion errors, and wherein the deletion probability is based at least in part on the one or more deletion errors;
      updating a confusion matrix using the insertion probability and the deletion probability, wherein the confusion matrix comprises a second insertion probability for a second language subword unit of the plurality of language subword units and a second deletion probability for the second language subword unit;
      updating language model training data to generate updated language model training data comprising a lattice, wherein the lattice comprises a path corresponding to the transcription, and wherein updating the language model training data comprises adding an alternate path to the lattice based at least partly on the confusion matrix; and
      discriminatively training a language model using the updated language model training data, wherein the language model is configured to generate a first score for the path corresponding to the transcription and a second score for the alternate path, and wherein discriminatively training the language model comprises updating the language model to generate, for the path corresponding to the transcription, a score higher than the first score and to generate, for the alternate path, a score lower than the second score.

2. The computer-implemented method of claim 1, wherein comparing the sequence of one or more recognized subword units to the sequence of one or more transcribed subword units comprises using a Levenshtein distance.

3. The computer-implemented method of claim 1, wherein each language subword unit comprises a phoneme.

4. The computer-implemented method of claim 1, wherein the generating is performed at least partly by a word recognizer.

5. The computer-implemented method of claim 1, wherein the generating is performed at least partly by a phoneme recognizer.

6. The computer-implemented method of claim 1, wherein the recognition hypothesis is stored in a data structure comprising a list of the N most probable hypotheses, where N is non-negative integer.

7. The computer-implemented method of claim 1, wherein the recognition hypothesis is stored in a data structure comprising a lattice.

8. The computer-implemented method of claim 7, wherein the lattice comprises a directed acyclic graph.

9. The computer-implemented method of claim 1,
wherein the insertion probability is further calculated based at least in part on a context of each insertion error, and
wherein the deletion probability is further calculated based at least in part on a context of each deletion error.

10. The computer-implemented method of claim 1 further comprising:
determining whether the recognition hypothesis comprises one or more substitution errors for the first language subword unit; and
calculating a substitution probability for the first language subword unit, wherein the substitution probability is based at least in part on the one or more substitution errors.

11. A computer-implemented method comprising:
under control of one or more computing devices configured with specific computer-executable instructions,
generating a lattice comprising a plurality of recognition hypotheses for acoustic model training data,
wherein the acoustic model training data is associated with a transcription,
wherein the transcription comprises a sequence of one or more transcribed subword units,
wherein a first path through the lattice comprises a first sequence of one or more recognized subword units,
wherein each transcribed subword unit of the sequence of transcribed subword units is one of a plurality of language subword units, and
wherein each recognized subword unit of the first sequence of recognized subword units is one of the plurality of language subword units;
calculating a substitution probability that a first language subword unit is substituted by a second language subword unit based at least in part on a comparison of the first sequence of one or more recognized subword units to the sequence of one or more transcribed subword units;
generating a confusion matrix using the substitution probability, wherein the confusion matrix comprises a plurality of substitution probabilities;
updating language model training data to generate updated language model training data, wherein updating the language model training data comprises adding an alternate transcription based at least partly on the transcription and the confusion matrix; and
discriminatively training a language model using the updated language model training data.

12. The computer-implemented method of claim 11, wherein each subword unit comprises a phoneme.

13. The computer-implemented method of claim 11, wherein the generating is performed at least partly by a word recognizer.

14. The computer-implemented method of claim 11, wherein the generating is performed at least partly by a phoneme recognizer.

15. The computer-implemented method of claim 11, wherein the language model is configured to generate a first score for the transcription and a second score for the alternate transcription, and wherein discriminatively training the language model comprises updating the language model to generate, for the transcription, a score higher than the first score and to generate, for the alternate transcription, a score lower than the second score.

16. The computer-implemented method of claim 11, wherein calculating the substitution probability comprises:
determining a first posterior probability for the first language subword unit in the transcription; and
determining a second posterior probability for the second language subword unit in the first path through the lattice, wherein the first language subword unit has been substituted by the second language subword unit in the first path through the lattice;
wherein calculating the substitution probability is further based at least in part on the first posterior probability and the second posterior probability.

17. The computer-implemented method of claim 11:
wherein a second path through the lattice comprises a second sequence of one or more recognized subword units,
wherein each recognized subword unit of the second sequence of recognized subword units is one of the plurality of language subword units, and
wherein calculating the substitution probability that the first language subword unit is substituted by the second language subword unit is further based at least in part on a comparison of the second sequence of one or more recognized subword units to the sequence of one or more transcribed subword units.

18. The computer-implemented method of claim 11 further comprising:
calculating a substitution probability that the first language subword unit is substituted by a third language subword unit based at least in part on a comparison of the first sequence of one or more recognized subword units to the sequence of one or more transcribed subword units.

19. The computer-implemented method of claim 11, further comprising:
comparing the first sequence of one or more recognized subword units to the sequence of one or more transcribed subword units;
determining whether the first path through the lattice comprises one or more deletion errors for the first language subword unit;
determining whether the first path through the lattice comprises one or more insertion errors for the first language subword unit;
calculating an insertion probability for the first language subword unit based at least in part on the one or more insertion errors; and
calculating a deletion probability for the first language subword unit based at least in part on the one or more deletion errors.

20. The computer-implemented method of claim 11, wherein the plurality of substitution probabilities comprises, for each combination of two different language subword units of the plurality of language subword units, a corresponding substitution probability that one language subword unit of the two different language subword units will be confused with another language subword unit of the two different language subword units.

21. The computer-implemented method of claim 11, wherein the updated training data comprises the transcription, and wherein the alternate transcription comprises the transcription with a substitution of the second language subword unit for the first language subword unit.

22. The computer-implemented method of claim 21, wherein discriminatively training the language model comprises updating a parameter of the language model to increase a difference between a first score generated using the transcription and a second score generated using the alternate transcription.

23. A non-transitory computer readable medium storing a computer-executable module, the computer-executable module, when executed by one or more processors, causing the one or more processors to perform a process comprising:
- generating a lattice comprising a plurality of recognition hypotheses for acoustic model training data,
  - wherein the acoustic model training data is associated with a transcription,
  - wherein the transcription comprises a sequence of one or more transcribed subword units,
  - wherein a first path through the lattice comprises a first sequence of one or more recognized subword units,
  - wherein each transcribed subword unit of the sequence of transcribed subword units comprises one of a plurality of language subword units, and
  - wherein each recognized subword unit of the sequence of recognized subword units comprises one of the plurality of language subword units;
- calculating a substitution probability that a first language subword unit is substituted by a second language subword unit based at least in part on a comparison of the first sequence of one or more recognized subword units to the sequence of one or more transcribed subword units;
- generating a confusion matrix using the substitution probability, wherein the confusion matrix comprises a plurality of substitution probabilities;
- updating language model training data to generate updated language model training data, wherein updating the language model training data comprises adding an alternate transcription based at least partly on the transcription and the confusion matrix; and
- discriminatively training a language model using the updated language model training data.

24. The non-transitory computer readable medium of claim 23, wherein each subword unit comprises a phoneme.

25. The non-transitory computer readable medium of claim 23, wherein the generating is performed at least partly by a word recognizer.

26. The non-transitory computer readable medium of claim 23, wherein the generating is performed at least partly by a phoneme recognizer.

27. The non-transitory computer readable medium of claim 23, wherein the language model is configured to generate a first score for the transcription and a second score for the alternate transcription, and wherein discriminatively training the language model comprises updating the language model to generate, for the transcription, a score higher than the first score and to generate, for the alternate transcription, a score lower than the second score.

28. The non-transitory computer readable medium of claim 23:
- wherein a second path through the lattice comprises a second sequence of one or more recognized subword units,
- wherein each recognized subword unit of the second sequence of recognized subword units is one of the plurality of language subword units, and
- wherein calculating the substitution probability that the first language subword unit is substituted by the second language subword unit is further based at least in part on a comparison of the second sequence of one or more recognized subword units to the sequence of one or more transcribed subword units.

29. The non-transitory computer readable medium of claim 23, wherein the plurality of substitution probabilities comprises, for each combination of two different language subword units of the plurality of language subword units, a corresponding substitution probability that one language subword unit of the two different language subword units will be confused with another language subword unit of the two different language subword units.

30. The non-transitory computer readable medium of claim 23, wherein the updated training data comprises the transcription, and wherein the alternate transcription comprises the transcription with a substitution of the second language subword unit for the first language subword unit.

31. The non-transitory computer readable medium of claim 30, wherein discriminatively training the language model comprises updating a parameter of the language model to increase a difference between a first score generated using the transcription and a second score generated using the alternate transcription.

* * * * *